US007738225B2

(12) United States Patent
Briskin

(10) Patent No.: US 7,738,225 B2
(45) Date of Patent: Jun. 15, 2010

(54) CIRCUIT AND METHOD FOR LIMITING POWER TO A LOAD

(75) Inventor: Boris Briskin, Ankeny, IA (US)

(73) Assignee: Micrel, Incorporated, San Jose, CA (US)

( * ) Notice: Subject to any disclaimer, the term of this patent is extended or adjusted under 35 U.S.C. 154(b) by 314 days.

(21) Appl. No.: 11/323,643

(22) Filed: Dec. 29, 2005

(65) Prior Publication Data

US 2007/0156258 A1 Jul. 5, 2007

(51) Int. Cl.
*H02H 3/08* (2006.01)
*H02H 9/02* (2006.01)

(52) U.S. Cl. .......................... 361/86; 361/89; 361/93.9

(58) Field of Classification Search .................. 361/86, 361/89, 93.9
See application file for complete search history.

(56) References Cited

U.S. PATENT DOCUMENTS 4,572,975 A * 2/1986 Bowers ...................... 327/359
5,055,767 A * 10/1991 Nelson ....................... 323/285
5,132,560 A * 7/1992 Kane .......................... 327/65
6,122,180 A 9/2000 Seo et al.
6,141,197 A 10/2000 Kim et al.
6,449,113 B1 * 9/2002 Leclerc et al. ................ 360/66
6,704,181 B2 3/2004 Saksa
6,724,152 B2 * 4/2004 Nostwick .................... 315/207
6,784,737 B2 * 8/2004 Martin et al. ............... 330/257
6,836,099 B1 12/2004 Amarillas et al.
7,177,130 B2 * 2/2007 Ohshima, Shunzou ..... 361/93.9
7,211,966 B2 * 5/2007 Green et al. ................ 315/224
2005/0013079 A1 * 1/2005 Mitsuda ...................... 361/100

FOREIGN PATENT DOCUMENTS

JP 06289943 * 10/1994

OTHER PUBLICATIONS

L6560 Data Sheet, ST Microelectronics, 2000, pp. 1-13.*
Wiley Encyclopedia of Electrical and Electronics Engineering, 1999, John Wiley & Sons Inc., V.1, pp. 486-489.*
Unknown, "*BASIS—The Network Audio Solution*", Digital Systems Products, Audio Products, Inc. (2004) pp. 1-3.

* cited by examiner

*Primary Examiner*—Stephen W Jackson
*Assistant Examiner*—Zeev Kitov
(74) *Attorney, Agent, or Firm*—Dorsey & Whitney LLP

(57) ABSTRACT

A circuit and method for limiting the power supplied to a load are provided. The circuit and method prevent power supplied to the load from exceeding a power threshold for a programmable amount of time specified in a timer. The circuit includes a voltage controlled current source coupled to the load. A current multiplier divider is coupled to the voltage controlled current source and a timer is coupled to the load. A comparator with an adaptive threshold is coupled to the current multiplier divider and the input for controlling the timer to limit the power supplied to the load.

25 Claims, 4 Drawing Sheets

155 $R_{SENS}$ 180 NFET
$V_{in}$ + $V_{SENS}$ - $V_{out}$
175 $C_{bypass}$ 100
switch
Gate current source $I_{gate}$
185 170 165 160
Programmable Timer
$V_{TH}$ 150 153
120 Current mirror
$V_{load}$ (feedback)
$V_{out}$ (feedback)
110 107 $R_2$
125 $I_{VCCS}$
$I_{TH}$ Current multiplier divider $I_B$
$R_1$
145 130
$I_A$ $I_C$ 170 + $V_{sup}$ 115
Current mirror $I_{REF}$ 105 $R_{VCCS}$
140 135
Current reference
Voltage reference (bandgap) 109
Biasing circuit 100
Vout
Vin
Cbypass
175
NFET
180
RSENS
155
VSENS
switch
170
Programmable Timer
165
Igate
Gate current source
185
160
153
VTH
150
ITH
Current multiplier divider
125
IB
IC
IA
IREF
Current mirror
120
IVCCS
170
107
+ Vsup
RVCCS
109
105
R2
110
R1
115
Vload (feedback)
Vout (feedback)
130
Voltage reference (bandgap)
135
Current reference
140
Current mirror
145
Biasing circuit 125
200
205
210
215
220
225
230
235
240
245
250
Q1
Q2
Q3
Q4
Vcc
V+
V-
Vout
PMOS
NMOS
NMOS
Iout
I1
I2
I3
+
-

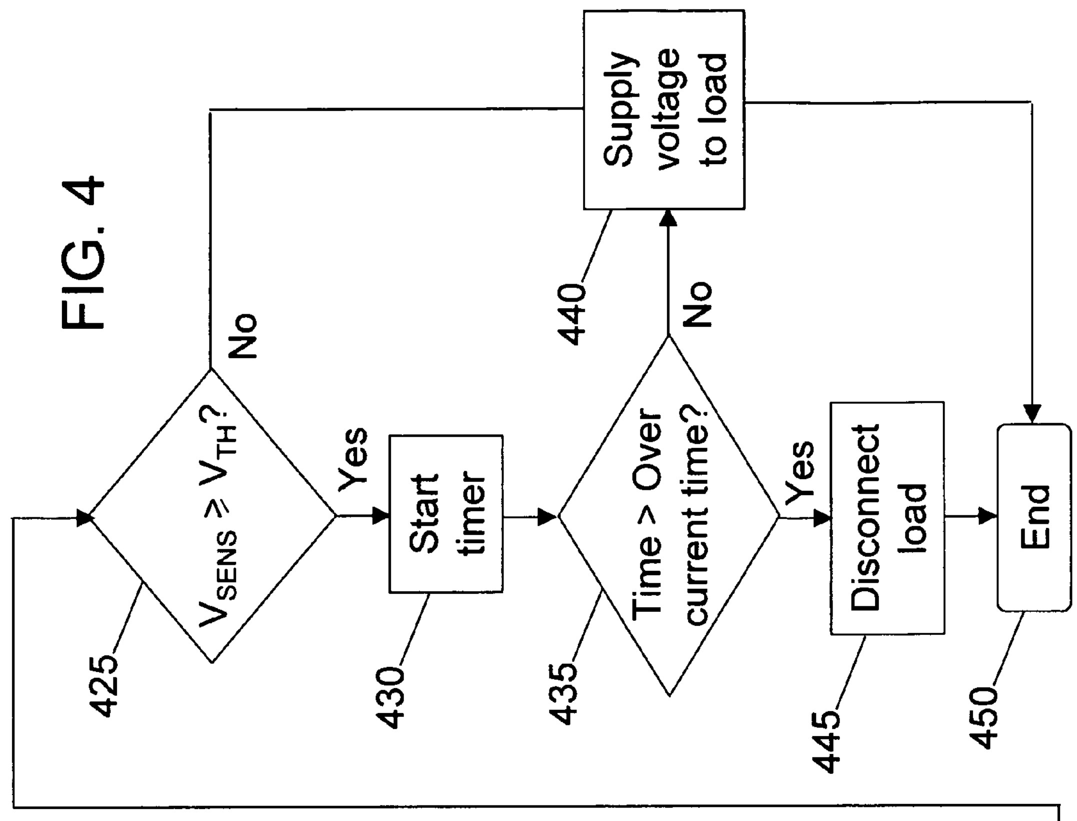
FIG. 4
425
$V_{SENS} \geq V_{TH}$?
No
Yes
430
Start timer
435
Time > Over current time?
No
Yes
440
Supply voltage to load
445
Disconnect load
450
End
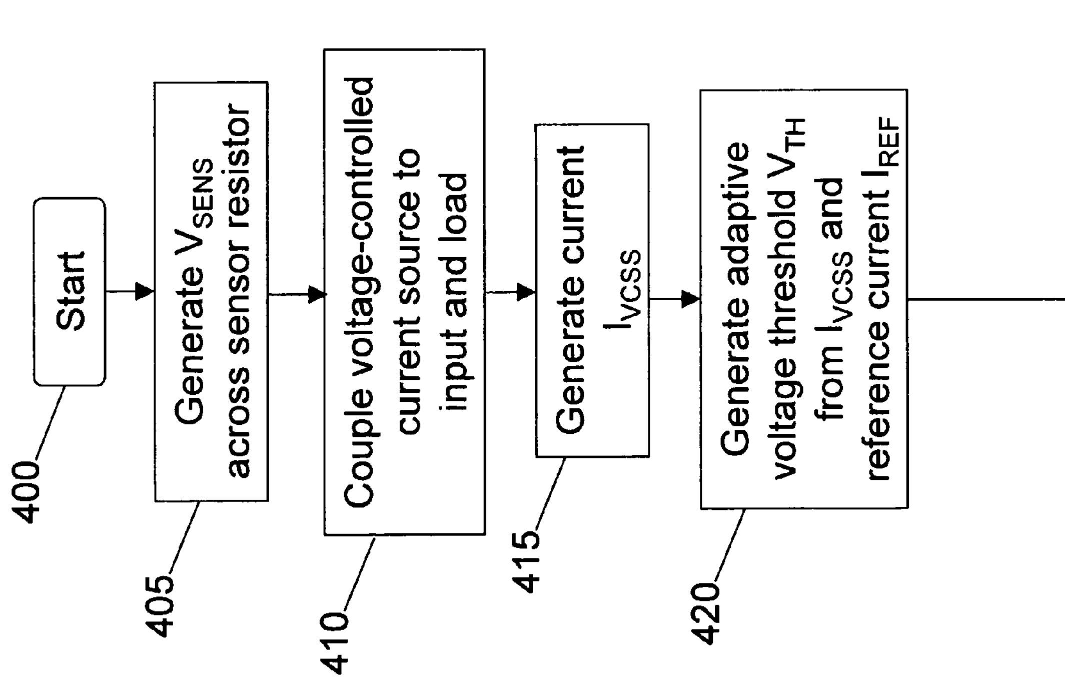
400
Start
405
Generate $V_{SENS}$ across sensor resistor
410
Couple voltage-controlled current source to input and load
415
Generate current $I_{VCSS}$
420
Generate adaptive voltage threshold $V_{TH}$ from $I_{VCSS}$ and reference current $I_{REF}$

CIRCUIT AND METHOD FOR LIMITING POWER TO A LOAD

FIELD OF THE INVENTION

The present invention relates generally to power controllers, and more particularly, to a power controller having an adaptive trip threshold for limiting the power supplied to a load.

BACKGROUND INFORMATION

Power controllers have been provided to limit the power delivered to a load, thereby protecting it from thermal failure or other damage. See, for example, U.S. Pat. No. 6,141,197, providing a smart circuit breaker for residential use, U.S. Pat. No. 6,836,099, providing a power controller for real-time monitoring and adjustment of power usage by the load, U.S. Pat. No. 6,704,181, providing an adaptive power controller that dynamically controls the power based on information received from the load, and U.S. Pat. No. 6,122,180, providing a constant power controller for maintaining a constant power to the load.

In particular, constant power controllers monitor the power delivered to the load such that the power may not exceed a predetermined power level for some programmable amount of time. Such power level may be the constant maximum value permitted by the load and set by the load manufacturer to comply with its safety restrictions. In typical implementations, an adaptive trip threshold may be used to indicate when to trip off power to the load. Usually it is desirable to implement the adaptive trip threshold transfer function with accuracy less than +/−2%. Realization of such transfer function prevents excessive losses of power without violating the safety restrictions of the load.

There remains, however, a need to implement this transfer function with higher accuracy and with a relatively simple power controller circuit.

SUMMARY OF THE INVENTION

In view of the foregoing, the present invention provides a power controller circuit for use with an input voltage to limit the power supplied to a load. The power controller circuit has an input adapted to receive the input voltage and includes a voltage controlled current source coupled to the load. A current multiplier divider is coupled to the voltage controlled current source and a timer is coupled to the load. A comparator is coupled to the current multiplier divider and the input for controlling the timer to limit the power supplied to the load.

DESCRIPTION OF THE DRAWINGS

The accompanying drawings, which are somewhat schematic in some instances and are incorporated in and form a part of this specification, illustrate several embodiments of the invention and, together with the description, serve to explain the principles of the invention.

FIG. 4 is a flow chart showing exemplary steps for controlling power supplied to a load in accordance with the present invention.

DETAILED DESCRIPTION OF EMBODIMENTS OF THE INVENTION

Figure 1:
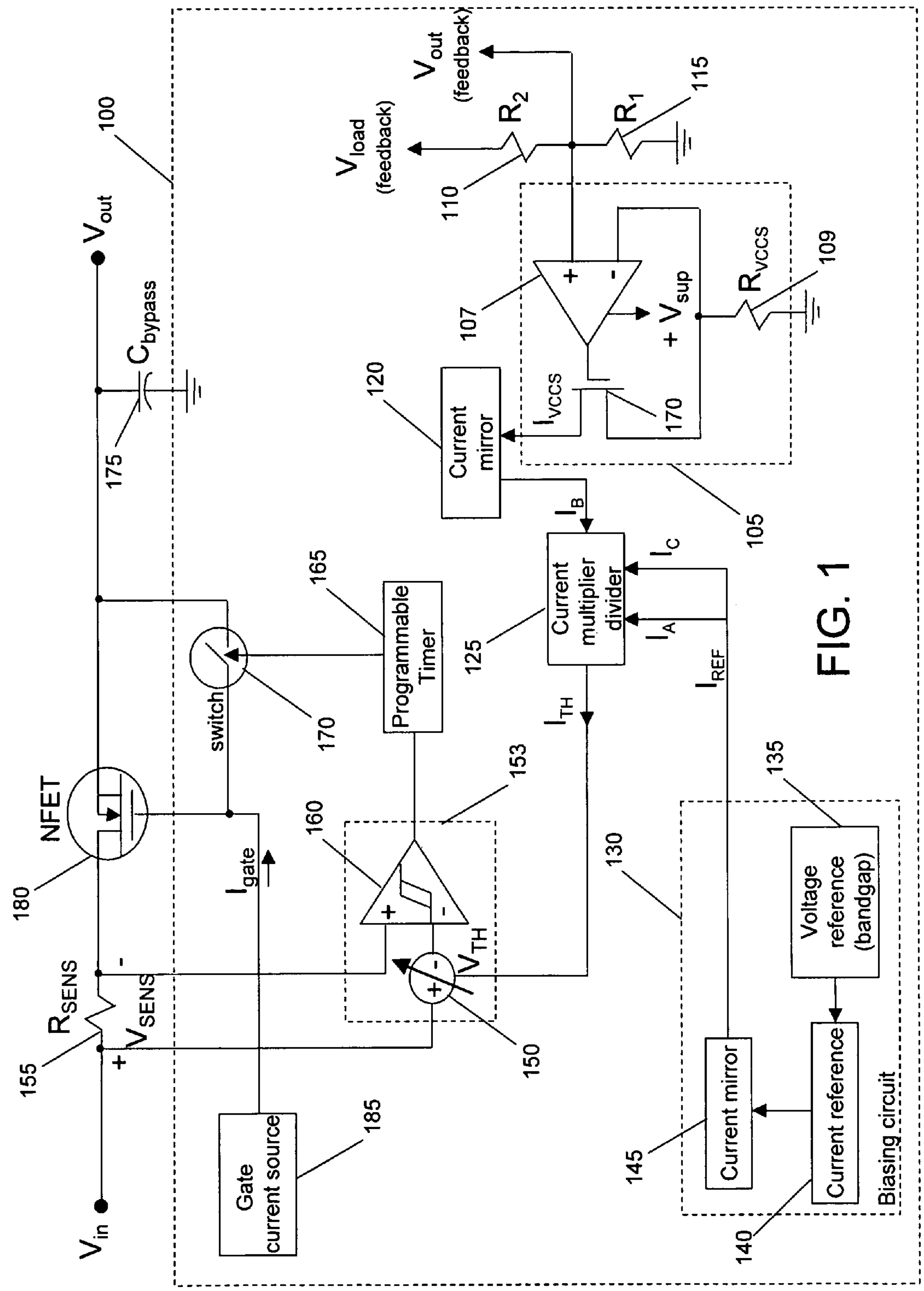
FIG. 1 is a schematic diagram of a power controller circuit in accordance with the present invention.
Figure 2:
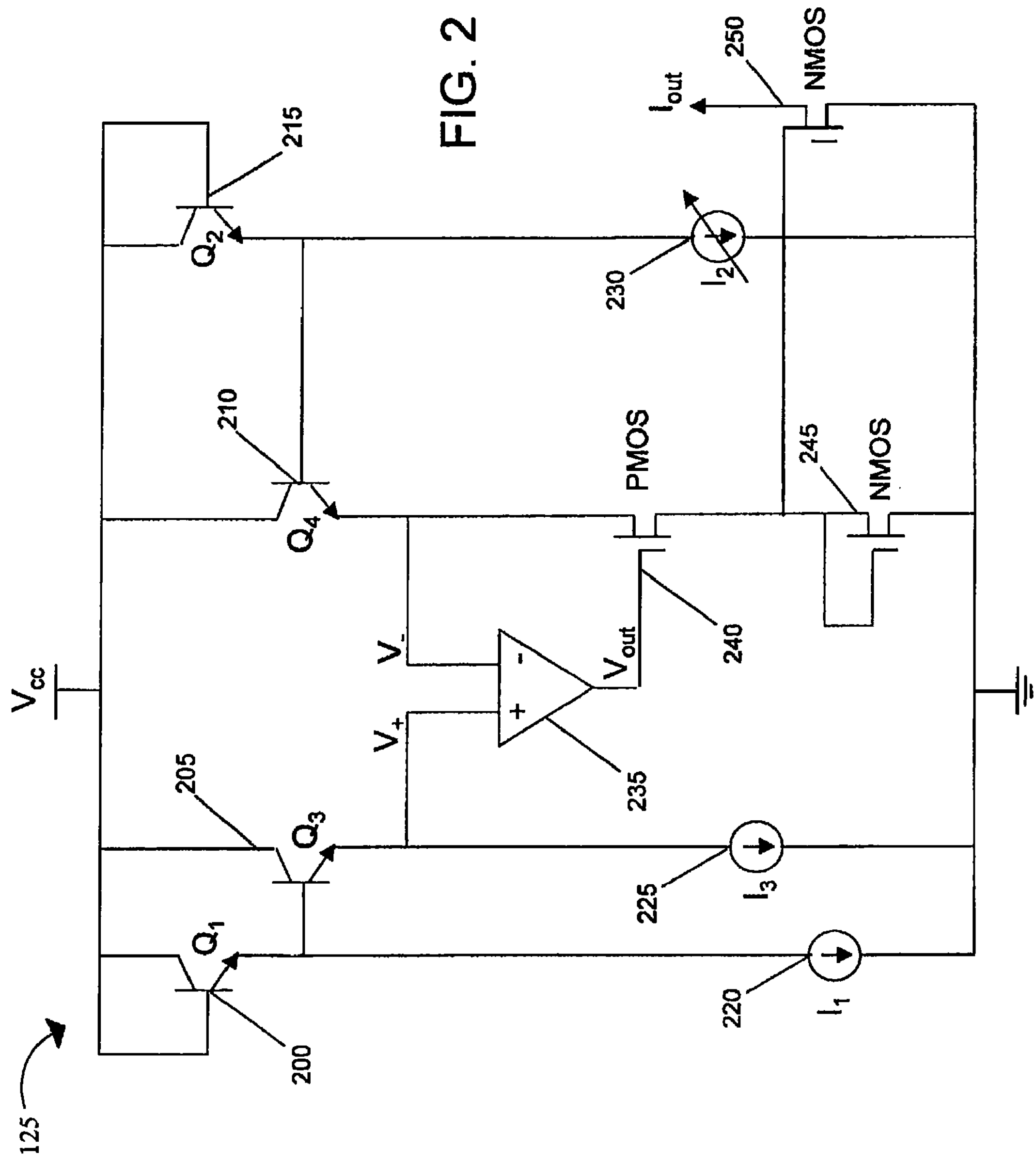
FIG. 2 is a schematic diagram of the current multiplier divider incorporated in the power controller circuit of FIG. 1.
Figure 3:
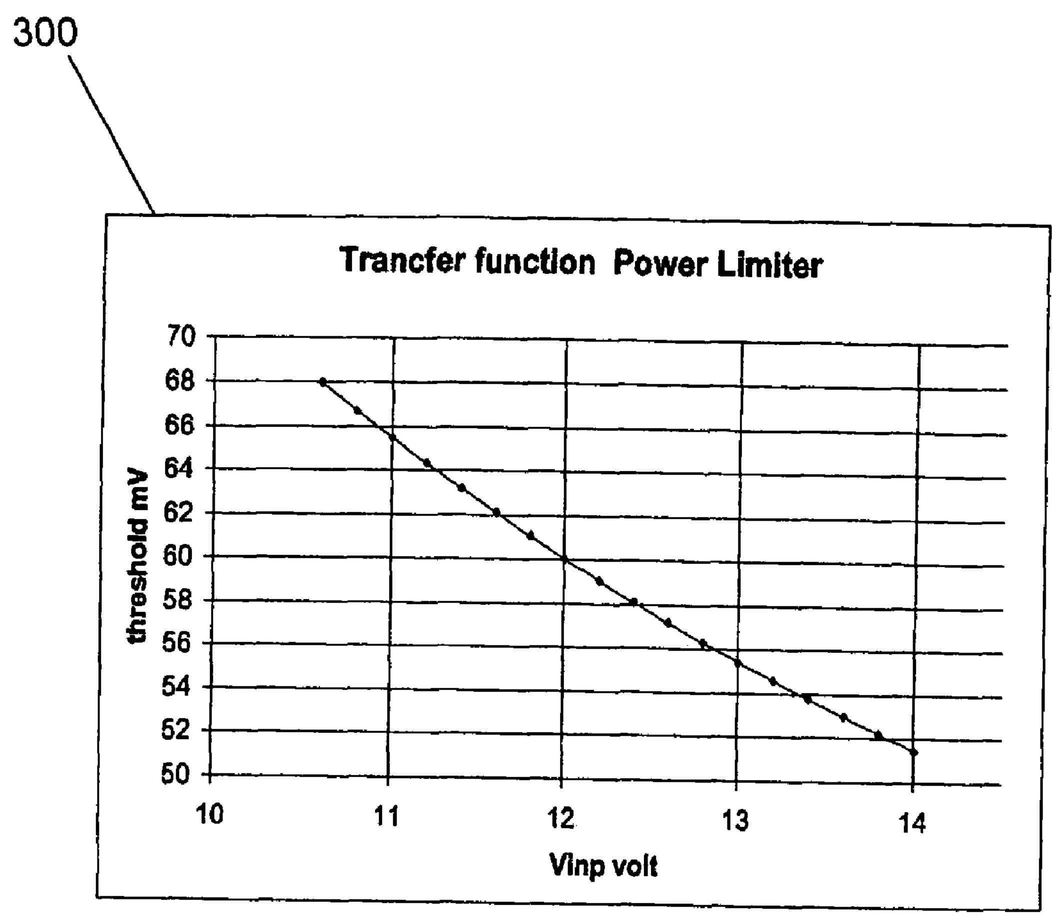
FIG. 3 is a graph of an adaptive trip threshold transfer function implemented according to the present invention.

The method of the present invention for controlling the power delivered to a load can be performed with a power controller circuit of the type shown in FIGS. 1-2 having the exemplary transfer function shown in FIG. 3. Power controller circuit 100 is adapted to sense a voltage across the load $V_{load}$ to generate an output voltage $V_{out}$ such that the power delivered to the load may not exceed a predetermined power level for some programmable amount of time.

Power controller circuit 100 may be implemented with an adaptive trip threshold that may be determined by:

$$V_{TH} = \frac{\text{Power}}{V_{load}} \times R_{SENS} \tag{1}$$

where Power is the constant maximum value permitted by the load and set by the load manufacturer to comply with its safety restrictions, $V_{load}$ is the voltage directly across the load, $R_{SENS}$ is a sensor resistor to monitor the output current and $V_{TH}$ is the adaptive trip threshold.

Power controller circuit 100, for use with voltage $V_{load}$, implements an adaptive voltage threshold to limit the power supplied to a load. Power controller circuit 100 includes highly linear voltage controlled current source 105 coupled to the load via a voltage divider formed by resistors 110 and 115 for generating a current that is input into precision current mirror 120. Precision current mirror 120 generates a current equal to its input current. This current is then input into current multiplier divider 125 coupled between precision current mirror 120 and biasing circuit 130. Biasing circuit 130 has bandgap voltage reference 135 coupled to current reference 140 and current mirror 145 to generate a reference current that is fed into current multiplier divider 125. The output of current multiplier divider 125 is coupled to current controlled voltage source 150 for generating the adaptive voltage threshold.

Power controller circuit 100 also includes means for comparing the adaptive voltage threshold with a sensor voltage developed across sensor resistor 155 from the input voltage and the current across the load. The means for comparing may include differential comparator 160 coupled to current controlled voltage source 150 or any other equivalent circuit capable of performing a comparison between two voltages.

Power controller circuit 100 further includes means for limiting the power supplied to the load if the sensor voltage exceeds the adaptive voltage threshold. The means for limiting the power may include programmable over current timer 165 coupled to differential comparator 160 and switch 170 coupled between programmable over current timer 165 and the load or any other equivalent circuit capable of limiting the power supplied to the load in the event the sensor voltage is above the adaptive voltage threshold.

Additional external components may include bypass capacitor $C_{bypass}$ 175 coupled to the load and power NFET 180 coupled between sensor resistor 155 and the load. Gate current source 185 is coupled to NFET 180 and switch 170 for ensuring a minimum drain-to-source voltage across NFET 180.

Operation of power controller circuit 100 is as follows. The voltage divider formed of resistors 110 and 115 generates an output voltage $V_{out}$ given by:

$$V_{out} = \frac{R_1}{R_1 + R_2} \times V_{load} \tag{2}$$

where N is the attenuation factor:

$$\frac{R_1}{R_1 + R_2} = N \tag{3}$$

The output voltage $V_{out}$ given by Equation (2) above is applied as an input to highly linear voltage controlled current source ("VCCS") 105. The output current of VCCS 105, denoted by $I_{VCCS}$, is proportional to the input current and consequently, strictly proportional to the output voltage directly developed on the load terminal, i.e., $V_{out}$. This current, $I_{VCCS}$, is then applied as an input to precision current mirror 120, which, in turn, generates a regulated current denoted by $I_B$ that may be equal to the input current $I_{VCCS}$.

The current $I_B$ generated by precision current mirror 120 is then input into current multiplier divider 125. Current multiplier divider 125, shown in FIG. 2, receives two other input currents as illustrated: $I_A$ and $I_C$, which are two equal constant currents derived from the reference current $I_{REF}$ generated by biasing circuit 130. Biasing circuit 130 may includes bandgap voltage reference 135, current reference 140, and current mirror 145 to generate constant current reference $I_{REF}$.

Current multiplier divider 125 performs arithmetic functions with four bipolar junction transistors Q1-Q4 (transistors 200, 205, 210 and 215) coupled to $V_{cc}$, current sources 220, 225 and 230 coupled to transistors 200, 205, and 215, respectively, amplifier 235 coupled between transistors 205 and 210, PMOS transistor 240 coupled to amplifier 235, and NMOS transistors 245 and 250 coupled to PMOS transistor 240.

To understand how arithmetic functions are performed by current multiplier divider 125, it is necessary to consider the operation of transistors 200, 205, 210, and 215 with the following operating equations:

$$V_{be} = V_t \times \ln\left(\frac{I_e}{I_s}\right) \tag{4}$$

$$I_e = I_s \times e^{\left(\frac{V_{be}}{V_t}\right)} \tag{5}$$

where $V_{be}$ is the base-emitter voltage, $V_t$ is the thermal voltage, $I_e$ is the emitter current, and $I_s$ is the saturation current.

If $V_{e3}=V_{e4}$, with $V_{e3}$ being the emitter voltage through transistor Q3 (205) and $V_{e4}$ being the emitter voltage through transistor Q4 (210), it follows that:

$$V_{be1}+V_{be3}=V_{be2}+V_{be4} \tag{6}$$

Applying Equation (4) into Equation (6) results in:

$$\left[V_t \times \ln\left(\frac{I_{e1}}{I_s}\right)\right] + \left[V_t \times \ln\left(\frac{I_{e3}}{I_s}\right)\right] = \left[V_t \times \ln\left(\frac{I_{e2}}{I_s}\right)\right] + \left[V_t \times \ln\left(\frac{I_{e4}}{I_s}\right)\right] \tag{7}$$

Eliminating the thermal voltage $V_t$ and operating on the logarithms to eliminate the saturation current $I_s$ from Equation (7) above results in:

$$\ln(I_{e1} \times I_{e3})=\ln(I_{e2} \times I_{e4}) \tag{8}$$

Removing the logarithms from Equation (8) results in:

$$I_{e1} \times I_{e3}=I_{e2} \times I_{e4} \tag{9}$$

With $V_+=V_-$, $I_{e2}=I_2$, $I_{e3}=I_3$ and $I_{e4}=I_4=I_{out}$, Equation (9) above may be rewritten as:

$$I_{out} = \frac{I_1 \times I_3}{I_2} \tag{10}$$

Equation (10) above therefore represents the arithmetic operations performed by current multiplier divider 125, that is, current multiplier divider 125 receives three input currents and outputs a current that is the result of the multiplication of two of the input currents divided by the third current. The output of current multiplier divider 125 may thus be given by:

$$I_{TH} = \frac{I_C \times I_A}{I_B} \tag{11}$$

With $I_A$ and $I_C$ equal to $I_{REF}$, that is, with $I_A=I_C=I_{REF}$, Equation (11) above may be rewritten as:

$$I_{TH} = \frac{I_{REF}^2}{I_B} \tag{12}$$

Applying this current, $I_{TH}$, to current controlled voltage source 150 therefore results in the following Equation:

$$V_{TH} = I_{TH} \times R_{TH} = \frac{I_{REF}^2}{I_B} \times R_{TH} \tag{13}$$

With current mirror 120 being a precision current mirror and $I_B$ being approximately equal to $I_{VCCS}$, Equation (13) may be rewritten as:

$$V_{TH} = \frac{I_{REF}^2}{I_{VCCS}} \times R_{TH} \tag{14}$$

where $V_{TH}$ is the adaptive voltage threshold generated by current controlled voltage source 150 and $R_{TH}$ is the equivalent input resistance of differential comparator circuit 153. For practical considerations, in order to avoid threshold shifting due to bias currents, it is recommended that $R_{TH}$ be no higher than 2-2.5 kilo-ohms.

It is appreciated that Equation (14) above may be compared to Equation (1) above, with the constant Power represented by the constant current $I_{REF}^2$, the voltage across the load $V_{load}$ represented by the current $I_{VCCS}$, which is a function of $V_{load}$, and $R_{SENS}$ represented by $R_{TH}$.

To satisfy Equation (1) with comparable Equation (14) above with the given $I_{REF}$ current and $R_{TH}$ resistance, it is necessary to determine the relationship between the current $I_{VCCS}$ and the voltage $V_{load}$. For two different voltages $V_{load\_1}$ and $V_{load\_2}$ and corresponding output voltages $V_{out\_1}$ and $V_{out\_2}$, the slope $G_M$ of VCCS 105 may be expressed as:

$$G_M = \frac{I_{VCCS\_1} - I_{VCCS\_2}}{V_{out\_1} - V_{out\_2}} \tag{15}$$

With $V_{out}=N\times V_{in}$ as in Equation (2) above, Equation (15) may be rewritten as:

$$G_M = \frac{I_{VCCS\_1} - I_{VCCS\_2}}{V_{load\_1} - V_{load\_2}} \times \frac{1}{N} \tag{16}$$

Since $G_M$ is the slope of VCCS 105, it follows that resistor $R_{VCCS}$ must be chosen as follows for Equation (14) to hold:

$$R_{VCCS} = \frac{1}{G_M} \times \frac{1}{N} \tag{17}$$

With the adaptive voltage threshold $V_{TH}$ determined by Equation (14), differential comparator 160 compares it to a sensor voltage, denoted by $V_{SENS}$, across sensor resistor $R_{SENS}$ (155). This sensor voltage $V_{SENS}$ may be expressed as:

$$V_{SENS}=I_{LOAD}\times R_{SENS} \tag{18}$$

so that:

$$V_{out}=V_{in}I_{LOAD}\times(R_{SENS}+R_{DS}) \tag{19}$$

where $R_{DS}$ is the drain-source resistance of external NFET 180.

To insure a minimum RDS across external NFET 180, gate current source 185 charges the gate of external NFET 180 with its slew rate so that:

$$\frac{dv}{dt} = \frac{I_{gate}}{C_{gate}} \tag{20}$$

The sensor voltage $V_{SENS}$ is then compared with the adaptive voltage threshold $V_{TH}$ with differential comparator 160. As long as $V_{SENS} \leqq V_{TH}$, differential comparator 160 may not trip off, that is, power controller circuit 100 may provide practically the full scale of the input voltage $V_{in}$ to the load.

However, if for any reason $V_{SENS} \geqq V_{TH}$, differential comparator 160 may trip off and trigger programmable timer 165. If this occurs longer than a given predetermined time period, programmable timer 165 activates switch 170, which in turn, immediately disconnects the load to protect the load from thermal failure or other damage.

It is then appreciated that, as described above, power controller circuit 100 continuously measures the power to be delivered across the load by monitoring the current across the load $I_{LOAD}$ and the output voltage $V_{out}$ and comparing the sensor voltage $V_{SENS}$ to the adaptive voltage threshold $V_{TH}$. It is also appreciated that the adaptive voltage threshold $V_{TH}$ may be considered a nonlinear function of the input and output voltages.

Using current multiplier divider 125 in power controller circuit 100 shown in FIG. 1 results in an adaptive trip threshold transfer function that is accurate and simple to implement.

An exemplary graph of such adaptive trip threshold transfer function is illustrated in FIG. 3. Graph 300 shows the changes in value of adaptive voltage threshold $V_{TH}$ with changes in value of the voltage $V_{load}$. In one exemplary embodiment with Power=240 Volts-Amperes and $R_{SENS}$=three mili-ohms, the adaptive voltage threshold changes from approximately 68.6 to 51.4 mili-volts. Realization of such transfer function prevents excessive losses of power without violating the safety restrictions of the load.

The method of the present invention for implementing this transfer function with the power controller circuit 100 of FIG. 1 is illustrated in a flow chart in FIG. 4. After generating a sensor voltage $V_{SENS}$ across the sensor resistor $R_{SENS}$ at step 405 and coupling voltage-controlled current source 160 to the input and the load at step 410 to generate current $I_{VCCS}$ at step 415, the adaptive voltage threshold $V_{TH}$ is generated at step 420. The sensor voltage $V_{SENS}$ is compared to the adaptive voltage threshold $V_{TH}$ at step 425, and if the comparison shows that $V_{SENS}$ is at least equal to or above $V_{TH}$, programmable timer 145 is triggered at step 430. If timer 145 is activated for more than a given predetermined time (step 435), the load is disconnected at step 445 to prevent the load from suffering thermal failure or other damage. Otherwise, the input voltage $V_{in}$ is supplied to the load at step 440.

It is appreciated that the steps shown in FIG. 4 are for illustration purposes only. Additional steps may be inserted therein without deviating from the principles and embodiments of the present invention.

The foregoing descriptions of specific embodiments and best mode of the present invention have been presented for purposes of illustration and description only. They are not intended to be exhaustive or to limit the invention to the precise forms disclosed. Specific features of the invention are shown in some drawings and not in others, for purposes of convenience only, and any feature may be combined with other features in accordance with the invention. Steps of the described processes may be reordered or combined, and other steps may be included.

The embodiments were chosen and described in order to best explain the principles of the invention and its practical application, to thereby enable others skilled in the art to best utilize the invention and various embodiments with various modifications as are suited to the particular use contemplated. Further variations of the invention will be apparent to one skilled in the art in light of this disclosure and such variations are intended to fall within the scope of the appended claims and their equivalents.

What is claimed is:

1. A circuit for use with an input voltage to limit the power supplied to a load, comprising an input adapted to receive the input voltage, a current mirror, a voltage controlled current source coupled to the load for providing an input current and coupled to the current mirror for generating a first input current equal to the input current, a current multiplier divider coupled to the voltage controlled current source, a comparator coupled to the current multiplier divider and the input to provide an output, and a timer coupled to the comparator to discontinue the power supplied to the load based at least on the output of the comparator.

2. The circuit of claim 1, wherein the current mirror is coupled between the voltage controlled current source and the current multiplier divider.

3. The circuit of claim 1, further comprising a biasing circuit coupled to the current multiplier divider for providing the first input current and a second input current to the current multiplier divider.

4. The circuit of claim 3, wherein the current multiplier divider provides an output current based upon the first input current, the second input current and the input current provided by the voltage controlled current source.

5. A circuit for use with an input voltage to limit the power supplied to a load, comprising an input adapted to receive the input voltage, a voltage controlled current source coupled to the load for providing an input current, a current multiplier divider coupled to the voltage controlled current source, a comparator coupled to the current multiplier divider and the input to provide an output, a current controlled voltage source coupled to the comparator to provide a current controlled adaptive voltage threshold as an input to the comparator, and a timer coupled to the comparator to discontinue the power supplied to the load based at least on the output of the comparator.

6. The circuit of claim 5, wherein the comparator includes a differential comparator.

7. The circuit of claim 6, further comprising a sensor resistor, a bypass capacitor, and a transistor coupled between the input and the load.

8. The circuit of claim 7, further comprising a gate current source coupled to the transistor.

9. The circuit of claim 7, wherein the timer is programmable and is coupled to a switch that turns off power to the load when the voltage across the sensor resistor exceeds the current controlled adaptive voltage threshold for an amount of time for which the timer is programmed.

10. A circuit for use with an input voltage to limit the power supplied to a load, comprising an input adapted to receive the input voltage, a current controlled voltage source coupled to a current multiplier divider for generating an adaptive voltage threshold, a sensor resistor coupled to the input between the input and the load, means for comparing a voltage across the sensor resistor to the adaptive voltage threshold and means for discontinuing power supplied to the load when the voltage across the sensor resistor exceeds the adaptive voltage threshold.

11. The circuit of claim 10, wherein the means for comparing the voltage across the sensor resistor to the adaptive voltage threshold includes a comparator.

12. The circuit of claim 11, wherein the means for discontinuing power supplied to the load includes a timer coupled to the comparator.

13. The circuit of claim 12, wherein the timer is programmable and wherein the means for discontinuing power supplied to the load further includes a switch coupled to the timer and configured to turn off power to the load when the voltage across the sensor resistor exceeds the adaptive voltage threshold for an amount of time for which the timer is programmed.

14. A method for limiting power supplied to a load, comprising providing an input voltage at an input, generating a sensor voltage across a sensor resistor from the input voltage, generating a first current by coupling a voltage controlled current source to the load, generating a second current by coupling a current multiplier divider to the voltage controlled current source to provide a first input current based on the first current and to a biasing circuit to provide second and third input currents based on a reference current, controlling a voltage source with the second current to generate an adaptive voltage threshold, comparing the sensor voltage to the adaptive voltage threshold, and discontinuing power to the load when the sensor voltage exceeds the adaptive voltage threshold.

15. The method of claim 14, wherein the comparing step includes comparing the sensor voltage to the adaptive voltage threshold using a comparator.

16. The method of claim 15, further comprising turning off power to the load when the sensor voltage exceeds the adaptive voltage threshold for a programmable period of time.

17. A circuit for use with an input voltage to limit the power supplied to a load, comprising an input adapted to receive the input voltage, a biasing circuit for generating a reference current, a voltage controlled current source coupled to the load for providing an input current by generating a first current proportional to an output voltage to the load, a current multiplier divider coupled to the voltage controlled current source to receive a first input current equal to the first current and coupled to the biasing circuit to receive second and third input currents based on the reference current, the current multiplier divider generating a second current based on the first, second and third input currents, a comparator coupled to the current multiplier divider and the input to provide an output, and a timer coupled to the comparator to discontinue the power supplied to the load based at least on the output of the comparator.

18. The circuit of claim 10, wherein the current multiplier divider is configured to receive a first input current proportional to an output voltage to the load and to receive second and third input currents based on a reference current, the current multiplier divider generating an output, and wherein the current controlled voltage source is coupled to the current multiplier divider to generate the adaptive voltage threshold based on the output.

19. The circuit of claim 5, further comprising a current mirror coupled between the voltage controlled current source and the current multiplier divider.

20. The circuit of claim 5, further comprising a biasing circuit coupled to the current multiplier divider for providing a first input current and a second input current to the current multiplier divider.

21. The circuit of claim 20, wherein the current multiplier divider provides an output current based upon the first input current, the second input current and the input current provided by the voltage controlled current source.

22. The circuit of claim 17, further comprising a current controlled voltage source coupled to the current multiplier divider to receive the second current and coupled to the comparator to provide a first output to the comparator based on the second current.

23. The circuit of claim 22, further comprising a sensor resistor coupled between the input and the load and configured to provide a second output to the comparator, the comparator providing the output to the timer based on the first and second outputs.

24. The circuit of claim 1, further comprising a current controlled voltage source coupled to the current multiplier divider to receive an output current of the current multiplier divider and coupled to the comparator to provide a first output to the comparator based on the output current.

25. The circuit of claim 24, further comprising a sensor resistor coupled between the input and the load and configured to provide a second output to the comparator, the comparator providing the output to the timer based on the first and second outputs.

* * * * *